(12) United States Patent
Heil et al.

(10) Patent No.: US 8,028,118 B2
(45) Date of Patent: Sep. 27, 2011

(54) USING AN INDEX VALUE LOCATED ON A PAGE TABLE TO INDEX PAGE ATTRIBUTES

(75) Inventors: Timothy Hume Heil, Rochester, MN (US); James Allen Rose, Rochester, MN (US); Andrew Henry Wottreng, Rochester, MN (US)

(73) Assignee: Internation Business Machines Corporation, Armonk, NY (US)

( * ) Notice: Subject to any disclaimer, the term of this patent is extended or adjusted under 35 U.S.C. 154(b) by 881 days.

(21) Appl. No.: 11/950,518

(22) Filed: Dec. 5, 2007

(65) Prior Publication Data

US 2009/0150642 A1 Jun. 11, 2009

(51) Int. Cl.
*G06F 12/10* (2006.01)

(52) U.S. Cl. ............ 711/6; 711/203; 711/205; 711/206; 711/207; 711/E12.059

(58) Field of Classification Search ............... 711/6, 203, 711/205, 206, 207
See application file for complete search history.

(56) References Cited

U.S. PATENT DOCUMENTS

| | | | |
|---|---|---|---|
| 6,446,034 B1 * | 9/2002 | Egolf | 703/27 |
| 6,549,997 B2 * | 4/2003 | Kalyanasundharam | 711/207 |
| 7,330,959 B1 * | 2/2008 | Anvin | 711/206 |
| 2002/0133685 A1 * | 9/2002 | Kalyanasundharam | 711/207 |
| 2002/0174299 A1 * | 11/2002 | Hayter et al. | 711/118 |
| 2003/0191894 A1 * | 10/2003 | Hayter et al. | 711/118 |
| 2004/0078631 A1 * | 4/2004 | Rogers et al. | 714/5 |
| 2004/0103247 A1 * | 5/2004 | Bita et al. | 711/114 |
| 2004/0193805 A1 * | 9/2004 | Au et al. | 711/131 |
| 2006/0212675 A1 * | 9/2006 | Sartorius et al. | 711/205 |
| 2007/0067578 A1 * | 3/2007 | Kurichiyath | 711/141 |

* cited by examiner

*Primary Examiner* — Mardochee Chery
(74) *Attorney, Agent, or Firm* — Patterson & Sheridan, LLP

(57) ABSTRACT

Embodiments of the invention provide methods and apparatus for increasing the number of page attributes specified by a page table while minimizing an increase in size of the page table. According to embodiments of the invention, attribute index bits may be included within a page table and may be used to determine page attributes stored within an attribute index. Additionally, embodiments of the invention provide a plurality of new page attributes.

19 Claims, 5 Drawing Sheets

PAGE TABLE 300

| VIRTUAL PAGE ADDRESS | REAL PAGE ADDRESS | ATTRIBUTE INDEX BITS | STATUS BITS |
|---|---|---|---|
| $VPA_1$ | $RPA_1$ | $AIB_1$ | $SB_1$ |
| ⋮ | ⋮ | ⋮ | ⋮ |
| $VPA_N$ | $RPA_N$ | $AIB_N$ | $SB_N$ |

ATTRIBUTE INDEX 305

| ATTRIBUTE INDEX BITS | PAGE ATTRIBUTE(S) |
|---|---|
| $AIB_1$ | $PA_1$ |
| ⋮ | ⋮ |
| $AIB_N$ | $PA_N$ |

PAGE TABLE 200

| VIRTUAL PAGE ADDRESS | REAL PAGE ADDRESS | ATTRIBUTE BITS | STATUS BITS |
|---|---|---|---|
| $VPA_1$ | $RPA_1$ | $AB_1$ | $SB_1$ |
| --------- | --------- | --------- | --------- |
| $VPA_N$ | $RPA_N$ | $AB_N$ | $SB_N$ |

FIG. 2

PAGE TABLE 300

| VIRTUAL PAGE ADDRESS | REAL PAGE ADDRESS | ATTRIBUTE INDEX BITS | STATUS BITS |
|---|---|---|---|
| $VPA_1$ | $RPA_1$ | $AIB_1$ | $SB_1$ |
| ----- | ----- | ----- | ----- |
| $VPA_N$ | $RPA_N$ | $AIB_N$ | $SB_N$ |

ATTRIBUTE INDEX 305

| ATTRIBUTE INDEX BITS | PAGE ATTRIBUTE(S) |
|---|---|
| $AIB_1$ | $PA_1$ |
| ----- | ----- |
| $AIB_N$ | $PA_N$ |

FIG. 3

PAGE TABLE 500

| ADDRESS (ATTRIBUTE INDEX) | VIRTUAL PAGE ADDRESS | REAL PAGE ADDRESS | STATUS BITS |
|---|---|---|---|
| 00000 | VPA $_1$ | RPA $_1$ | SB $_1$ |
| - - - - - | - - - - - | - - - - - | - - - - - |
| 111 | VPA $_N$ | RPA $_N$ | SB $_N$ |

ATTRIBUTE INDEX BITS 505

| ATTRIBUTE INDEX BITS | PAGE ATTRIBUTE(S) |
|---|---|
| 00000 | LOAD PAGE DATA INTO CACHE LEVEL 1, WRITE THROUGH |
| 00001 | LOAD PAGE DATA INTO CACHE LEVEL 2 |
| - - - | - - - |
| 11111 | CACHING INHIBITED |

FIG. 5

USING AN INDEX VALUE LOCATED ON A PAGE TABLE TO INDEX PAGE ATTRIBUTES

BACKGROUND OF THE INVENTION

1. Field of the Invention

Embodiments of the invention generally relate to computer systems.

2. Description of the Related Art

In many computer systems blocks of memory or pages may be allocated to programs or processes executing on the computer system. Pages may be allocated in order to separate the memory space used by the various processes executing on the computer system. This separation ensures that one process does not overwrite data being used by or associated with another process. The address space assigned to a process may be a range of virtual memory addresses for pages of data which are mapped to physical locations of the data located within the main memory or disk memory of a computer system.

In order to locate page data within the computer system, the processor may use page tables to translate virtual memory addresses into physical memory addresses. Page tables may contain a plurality of entries which map virtual memory addresses to the physical memory addresses where the page data is located in memory (e.g., main memory or disk memory).

In addition to a virtual page address and a corresponding real page address, each page table entry or row may also contain status bits. The status bits may indicate the status of the page data located at the physical memory address. For example, one status bit may indicate if the page data corresponding to a virtual memory address is located in main memory or is located in disk memory.

Each page table entry may also include attribute bits. The attribute bits may indicate specific attributes associated with the page data for an entry. Specifically, the attribute bits may indicate how the data is handled by the processor when performing operations on (accessing) the associated page data.

SUMMARY OF THE INVENTION

Embodiments of the present invention generally provide unique page attributes and methods and apparatus for increasing the number of page attributes which may be specified in a page table.

One embodiment provides a method of determining page attributes. The method generally includes receiving an instruction which contains a virtual memory address corresponding to page data stored in memory, comparing the virtual memory address to a page table, based on the comparison of the virtual memory address to the table, determining at least a page attribute index value for page data associated with the virtual memory address, and using the page attribute index value to determine at least one page attribute for page data associated with the virtual memory address.

One embodiment provides a computer readable medium containing a program. When executed, the program performs operations generally including receiving an instruction which contains a virtual memory address corresponding to page data stored in memory, comparing the virtual memory address to a page table, based on the comparison of the virtual memory address to the table, determining at least a page attribute index value for page data associated with the virtual memory address, and using the page attribute index value to determine at least one page attribute for page data associated with the virtual memory address.

One embodiment provides a system. The system generally includes a processing element, a page table comprising at least one memory address and a page attribute index value associated with the at least one memory address, and a attribute index comprising at least the page attribute index value and at least one page attribute associated with the page attribute index value, wherein the first processing element is configured to receive an instruction containing the at least one memory address, and compare the at least one memory address to the page table to determine the page attribute index value associated with the at least one memory address, and using the at least one page attribute index value to determine the page attribute.

BRIEF DESCRIPTION OF THE DRAWINGS

FIGS. 2, 3 and 5 are exemplary page tables and exemplary page attribute indexes, according to embodiments of the invention.

DETAILED DESCRIPTION OF THE PREFERRED EMBODIMENTS

Figure 1:
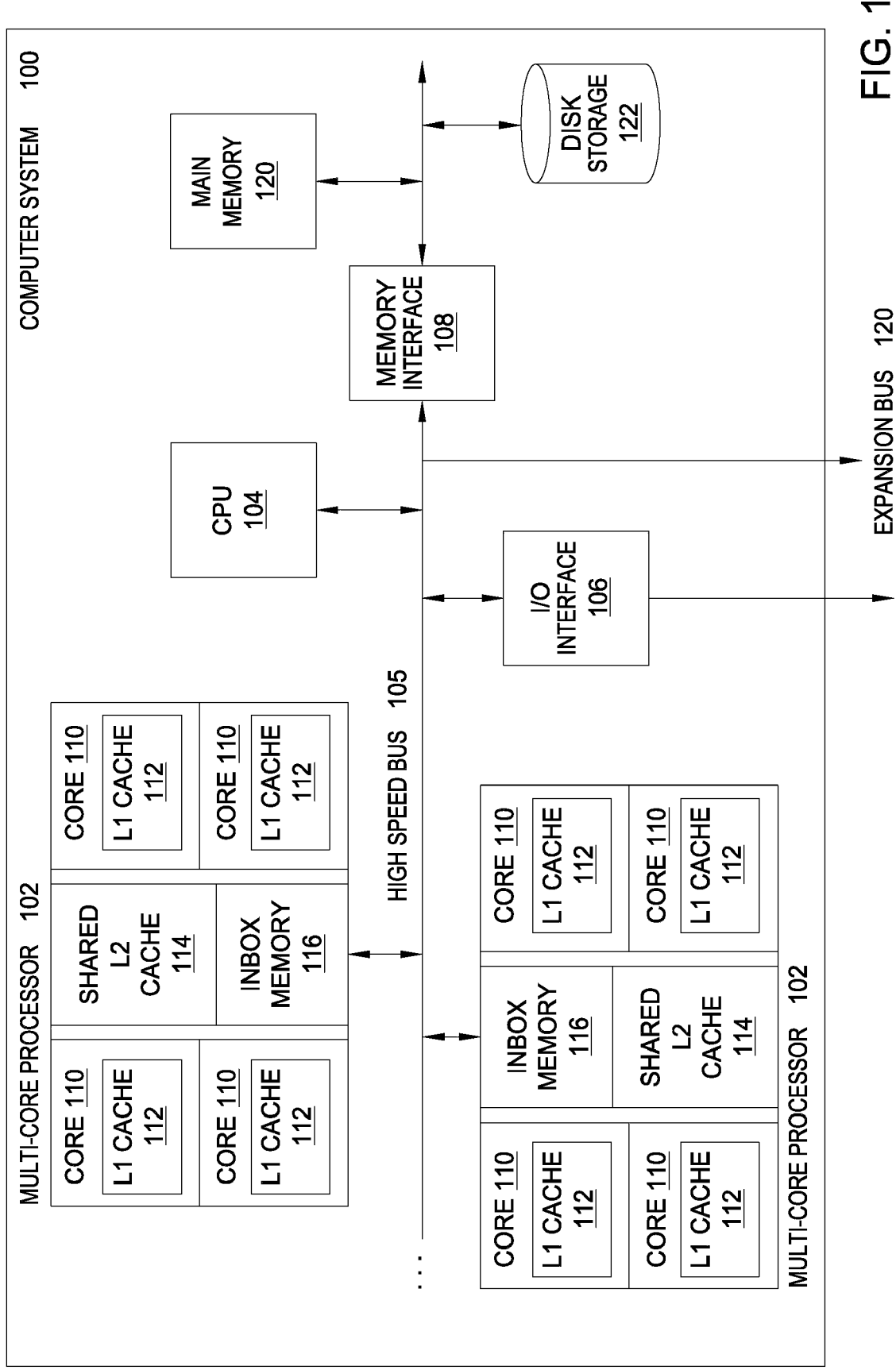
FIG. 1 illustrates a computer system, according to one embodiment of the invention.

The present invention provides methods and apparatus for specifying an increased number of page attributes without the need to increase the size of a page table or, if necessary, minimizing an increase in size of a page table. According to embodiments of the invention an increased number of page attributes may be specified using attribute index bits in the page table. The attribute index bits may correspond to entries within an attribute index. Each attribute index entry may define a page attribute which specifies how page data is to be handled as it is accessed in memory. In addition to increasing the number of page attributes which may be specified without increasing the size of the page table, embodiments of the invention also include a number of unique page attributes which can be specified within the page attribute index.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

Program Products Used with a Computer System

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

The memory interface 108 may be coupled and, therefore, provide access to a main memory 120 and secondary storage or disk memory 122. The main memory and disk memory may be any type of main memory or disk memory known to those skilled in the art. For example, main memory may be a DRAM (Dynamic Random Access Memory) chip or a plurality of DRAM chips. The disk memory may be, for example, a magnetic disk drive or optical disk drive.

Each processor core 110 in the computer system 100 may contain a plurality of processing threads and a core cache (e.g., an L1 cache). The processing threads located within each processor core 110 may have access to the shared L2 cache 114.

The processor cores 110 may also have access to a plurality of inboxes within the inbox memory 116. The inboxes may be memory mapped address space. The inboxes may be mapped to the processing threads located within each of the processor cores 110. Each thread located within the processor cores 110 may have a memory mapped inbox and access to all of the other memory mapped inboxes. The inboxes may make up a low latency and high bandwidth communications network used by the processor cores 110.

The processor cores 110 may use the inboxes as a network to communicate with each other and redistribute data processing work amongst the processor cores 110. For some embodiments, separate outboxes may be used in the communications network, for example, to receive the results of processing by processor cores 110. For other embodiments, inboxes may also serve as outboxes, for example, with one processor core 110 writing the results of a processing function directly to the inbox of another processor core 110 that will use the results.

Indexing Page Attributes

As described above, software running on a computer system (e.g., an operating system) may allocate blocks of memory or pages to programs or processes executing on the computer system (e.g., computer system 100). Pages may be allocated in order to separate the memory space used by the various processes executing on the computer system.

Furthermore, in order to locate page data on the computer system, the processor may use page tables to translate virtual memory addresses into physical memory addresses. Page tables may contain a plurality of entries which map virtual memory addresses to the physical memory addresses where the page data is located in memory (e.g., main memory or disk memory).

FIG. 2 illustrates an exemplary page table 200. As illustrated in FIG. 2, the first column of the page table 200 contains a plurality of virtual page addresses ($VPA_{1-N}$). Each virtual page address may correspond to a page of memory assigned by an operating system to be used by processes running on the computer system.

The second column of the page table 200 contains a plurality of physical or real page addresses ($RPN_{1-N}$). Each real page address may correspond to a virtual page address in the first column of the page table 200. A real page address may indicate the address of a physical page or block of data within the memory (e.g., main memory or disk memory) of the computer system 100.

In addition to a virtual page address and a corresponding real page address, each page table 200 entry or row may also contain status bits. The status bits may indicate the status of the page data located at the physical memory address.

Each page table entry may also include attribute bits. The attribute bits may indicate specific attributes associated with the page data for the entry. Specifically, the attribute bits may indicate how the data is handled by the processor when performing operations on or with the data. However, as described above, current page tables only specify a limited number of page attributes via the attribute bits.

Embodiments of the invention may increase the number of page attributes which may be specified without increasing or minimizing the increase in the size of the page table. According to one embodiment of the invention, attribute index bits and an attribute index may be used to specify more page attributes than simply using page attribute bits in the page table. Different combinations or values of the page attribute index bits may relate to different entries within the attribute index. Each entry within the attribute index may specify a unique page attribute or combination of page attributes. The unique page attribute or combination of page attributes from the attribute index may then be used by the processor when handling or accessing data associated with a page.

There are multiple techniques to perform a look-up. One technique is to use the attribute index bits to directly index the page attribute table. In that case, the attribute index bits are not in the table. Another technique is an associative lookup, where the attribute bits are placed in no particular order in a content addressable memory (CAM). In the case where attributes are limited, a separate attribute index may not be required (e.g., as the attribute bits themselves may be sufficient to describe the type of access).

FIG. 3 illustrates an exemplary page table 300 containing attribute index bits, according to one embodiment of the invention. Similar to the page table 200 illustrated in FIG. 2, the page table 300 illustrated in FIG. 3 contains a column which specifies virtual page numbers, a column which specifies corresponding physical page numbers, and a column which specifies status bits. However, instead of specifying page attributes in the page table as in the page table 200 illustrated in FIG. 2, the page table 300 illustrated in FIG. 3 contains a column of attribute index bits. According to embodiments of the invention, the attribute index bits or the value of the attribute index bits may correspond to attribute index bits or a value of the attribute index bits in an attribute index.

FIG. 3 illustrates an exemplary attribute index 305 according to one embodiment of the invention. As illustrated the attribute index 305 may contain a plurality of entries (rows), and each entry may correspond to a unique combination of attribute index bits or value of the attribute index bits. Each entry may also contain a specification of the page attributes which correspond to the unique combination of attribute index bits. The attribute index 305 may contain as many entries as there are different combinations or values of the attribute index bits. For example, if there are four attribute index bits in the page table 300 and in the attribute index 305, then there are sixteen ($2^4$) possible distinct values of the attribute index bits and, consequently, there may be sixteen entries in the attribute index.

Each entry within the attribute index 305 may specify a different page attribute, or a combination of page attributes. Therefore, each entry within the attribute index may specify a way of handling accesses to page data which have the corresponding attribute index bits within the page table.

A plurality of entries within the page table may correspond to page data which is to be handled similarly. Consequently, these entries may contain the same attribute index bits or the same attribute index bit value.

By using the same number of bits within the page table which may have been formerly used to identify the page attributes, the attribute index bits may specify a larger number of page attributes without increasing the size of the page table. For example, a page table may have used four attribute bits to specify page attributes (e.g., write through, cache inhibited, coherent, guarded or unguarded). As used herein, the term guarded generally refers to a memory attribute (such as one used in IBM's PowerPC architecture) that essentially specifies that no speculative accesses are allowed, and each access completes before the next access is allowed to start. If instead of using those four bits to specify page attributes the bits specified attribute index values, the four bits could specify sixteen different page attributes rather than four. Consequently, indexing page attributes may increase the number of page attributes which can be specified without increasing the size of the page table. However, if a larger number of page attributes need to be specified, then the number of attribute index bits may be increased which may correspond to a larger number of entries within the attribute index table.

Method of Using a Page Attribute Index

Figure 4:
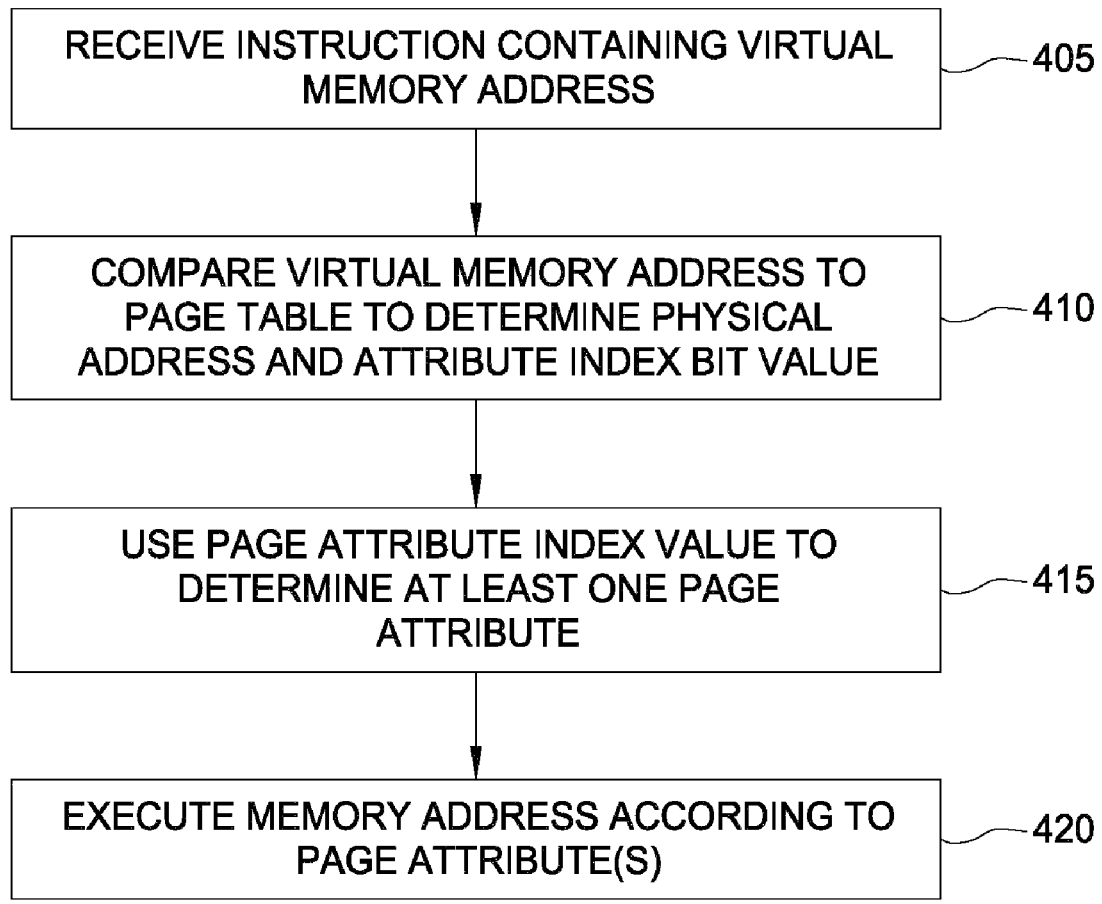
FIG. 4 is a flowchart illustrating an exemplary method of determining page attributes, according to embodiments of the invention.

FIG. 4 is a flowchart which illustrates an exemplary method 400 of using a page table containing attribute index bits and an attribute index, according to embodiments of the invention. The method 400 begins at step 405, for example, when a processor (e.g., processor 102) receives an instruction which includes a virtual address.

Next, at step 410 the processor may use logic to compare the virtual address to a page table. This comparison may result in the determination of the physical address which corresponds to the virtual address. Furthermore, the comparison may result in the determination of the status (e.g., via the status bits) of the data residing at the physical address.

Furthermore, according to embodiments of the invention, through the comparison the processor may determine the attribute index bits for page data located at the physical address which corresponds to the virtual address.

After determining the attribute index bits, at step 415 the processor may use logic to read attribute bits, for example, using a relatively simple look-up. As an example, if the index bits indicate "attribute set 9," the system just reads the attribute bits out of slot 9. This operation may result in the determination of the page attributes which correspond to the page data located at the physical memory address.

Next, at step 420, the processor may access the page data at the physical memory address (e.g., read from, write to, etc.) and the processor may access the page data in a manner according to the page attributes specified in the attribute index.

For example, an instruction may be received at step 405 which specifies a first virtual page address ($VPA_1$). Next at step 410 the processor may compare the first virtual page address ($VPA_1$) to a page table. For example, at step 410 the processor may compare the first virtual page address ($VPA_1$) to a page table similar to the page table 500 illustrated in FIG. 5.

The comparison may result in the determination that the first virtual page address ($VPA_1$) corresponds to a first physical or real page address ($RPA_1$), and the status bits are $SB_1$. Furthermore, the comparison may result in the determination that the page attribute index bits are '00000'.

Next at step 415 the processor may compare the attribute index bits '00000' to the attribute index in order to determine the page attributes for the page data located at the real page address $RPA_1$. As illustrated in the attribute index 505 shown in FIG. 5, the page attribute index bits '00000' may correspond to the first entry within the attribute index 505. Furthermore, the first entry within the attribute index 505 indicates that the page attribute for page data with attribute index bits '00000' is that the page data is to be loaded into cache level 1 and that accesses to the page data are write through. The processor may then handle the page data according to the page attributes indicated in the attribute index (i.e., load into cache level 1, write through).

Page Table Attributes

As described with respect to FIG. 3, embodiments of the invention provide a way to specify an increased number of page attributes. These page attributes may specify techniques or ways of handling page data as it is loaded into or from memory. In addition to being able to specify page attributes which may have been specified using attribute bits in the page table, embodiments of the invention also include new and unique page attributes. These new and unique page attributes may be specified using the attribute index bits and an attribute index.

According to one embodiment of the invention, a new page attribute may be one which indicates that page data is to be read into a specific cache memory level (e.g., L1 cache memory, L2 cache memory, etc.). Furthermore, another page attribute may specify that page data is to be read into a specific way of a cache level. Consequently, a combination of these new page attributes may indicate that page data is to be loaded into a specific level of cache and into a specific way of the specific level of cache.

According to another embodiment of the invention a page attribute may specify that page data is read into or loaded into the least recently used location of a specific cache level as it is loaded from memory. By specifying that page data be read into the least recently used location of a specific cache level, the memory system may ensure that the page data is loaded into the specific cache level, and it stays in the cache level into which it was loaded for a for a minimum amount of time (i.e., as least recently used it may be replaced first when new data is entered into the cache).

According to another embodiment of the invention, another page attribute may specify that certain page data may be pre-fetched ahead of the page data which is to be accessed and loaded into the cache. According to another embodiment of the invention, the page attributes may specify that K number of cache lines may be pre-fetched (where K is an integer from 1-N). Another page attribute may specify that data may be pre-fetched in strides of L (where L is an integer from 1-N).

In systems with write-through L1 data caches, it is common for writes to nearby addresses to be combined between the L1 data cache and the L2 cache. For instance, a write-combining buffer may combine multiple writes to the same 64 B write-combining block, and then send all the data down to the L2 as a single write. This reduces the amount of write traffic that the L2 must consume. Page attributes may specify that write-combining is not helpful for certain pages, or that the write-combining buffer should expect certain patterns, such as writes that cover a full block. This will allow the write-combining buffer to send writes to the L2 more quickly, and allow it to use its combing space more efficiently.

In addition, according to embodiments of the invention a page attribute may indicate that accesses to certain data may be cache inhibited. More specifically, a page attribute may specify that reads of a page may be cache inhibited and may specify the handling of reads which are cache inhibited. For example, a page attribute may specify a path a cache inhibited read may take through the system and what operations can be done (e.g., sequential reads can be combined).

According to another embodiment of the invention, a page attribute may indicate that writes of certain page data are inhibited and may specify the handling of writes which are cache inhibited. For example, a page attribute may specify that writes for a page are cache inhibited and may also specify what path cache-inhibited writes take through the system.

Furthermore, a page attribute may specify what operations can be done when writing page data. For example, a page attribute may specify that sequential writes can be combined. According to another embodiment of the invention, a page attribute may specify that writes to a page are write through and may specify the cache level handling the write through access (e.g., bypass cache level 1, bypass cache level 2, etc.).

According to another embodiment of the invention a page attribute may specify the handling of dynamic memory access (DMA) like operations. For example, the page attribute may include a page address to write data into. The included address may then be used to address the data to be read and, thus, may allow data to be copied from one memory location to another. Alternatively, the page attribute entry may contain a pointer to a table which may contain the address to write data into.

The page attributes in the attribute index may also include entries for currently supported page attributes. However, according to embodiments of the invention these entries may be clarified with additional bits specifying particular actions to take. For example, the page attributes may include entries for write through, cache inhibited, coherent or non-coherent access, guarded or unguarded access, and read or write attributes. An additional attribute could specify, for instance, that the cache inhibited data may be written combined.

For pages which are marked as cache inhibited using page attribute bits in a page table, all accesses to that page may be cache inhibited. However, according to embodiments of the invention, in addition to indicating that page data is cache inhibited a page attribute in the attribute index may specify that a page is cache inhibited for writes, but not cache inhibited for reads. Conversely, a page attribute in the attribute index may specify that a page is cache inhibited for reads, but not cache inhibited for writes.

Conclusion

By including attribute index bits within a page table and creating corresponding entries which specify page attributes in an attribute index, the number of page attributes which can be specified within a page table may be increased while minimizing an increase in size of the page table. Furthermore, embodiments of the invention provide additional page attributes which may be specified in the attribute index.

While the foregoing is directed to embodiments of the present invention, other and further embodiments of the invention may be devised without departing from the basic scope thereof, and the scope thereof is determined by the claims that follow.

What is claimed is:

1. A method of determining page attributes, comprising:
receiving an instruction which contains a virtual memory address corresponding to page data stored in memory;
comparing the virtual memory address to a page table;
based on the comparison of the virtual memory address to the page table, determining at least a page attribute index value for the page data associated with the virtual memory address; and
using the page attribute index value for accessing an attribute index table and determining at least one page attribute of the page data associated with the virtual memory address, wherein the attribute index table comprises of a plurality of page attributes,
wherein at least one of the plurality of page attributes specifies:
a first level of cache memory for use when reading data from the page data after a cache miss; and
a second level of cache memory for use when writing data to the page data that is different than the first level of cache memory.

2. The method of claim 1, further comprising accessing the page data at a physical memory address in a manner according to the at least one page attribute.

3. The method of claim 1, wherein the page table comprises a plurality of entries, and wherein each entry comprises at least of a virtual memory address, a corresponding physical memory address, and a corresponding page attribute index value.

4. The method of claim 1, wherein the attribute index table comprises a plurality of entries, wherein each entry comprises at least an attribute index value and a corresponding page attribute selected from the plurality of page attributes.

5. The method of claim 1, wherein a different page attribute of the plurality of page attributes specifies a level of cache memory to store the page data associated with the virtual memory address.

6. The method of claim 1, wherein a different page attribute of the plurality of page attributes specifies that writes should not be combined, or how writes should be combined when writing page data associated with the virtual memory address.

7. The method of claim 1, wherein a different page attribute of the plurality of page attributes specifies that page data associated with the virtual memory address is cache inhibited.

8. The method of claim 7, wherein a different page attribute of the plurality of page attributes specifies that at least one of reads to the page data are cache inhibited but writes are not cache inhibited, or that writes to the page data are cache inhibited but reads are not cache inhibited.

9. The method of claim 7, wherein a different page attribute of the plurality of page attributes specifies a path data is supposed to take through a system.

10. A computer readable storage medium containing a program which, when executed, performs operations comprising:
receiving an instruction which contains a virtual memory address corresponding to page data stored in memory;
comparing the virtual memory address to a page table;
based on the comparison of the virtual memory address to the table, determining at least a page attribute index value for the page data associated with the virtual memory address; and
using the page attribute index value for accessing an attribute index table and determining at least one page attribute of the page data associated with the virtual memory address, wherein the attribute index table comprises of a plurality of page attributes,
wherein at least one of the plurality of page attributes specifies:
a first level of cache memory for use when reading data from the page data after a cache miss; and
a second level of cache memory for use when writing data to the page data that is different than the first level of cache memory.

11. The computer readable storage medium of claim 10, wherein the operations further comprise:
accessing the page data at a physical memory address in a manner according to the at least one page attribute.

12. The computer readable storage medium of claim 10, wherein the page table comprises a plurality of entries, and wherein each entry comprises at least a virtual memory address, a corresponding physical memory address, and an corresponding page attribute index value.

13. The computer readable storage medium of claim 10, wherein the attribute index table comprises a plurality of entries, wherein each entry comprises at least an attribute index value and a corresponding page attribute selected from the plurality of page attributes.

14. The computer readable storage medium of claim 10, wherein a different page attribute of the plurality of page attributes specifies at least one of:
a specific level of cache memory to store page data associated with the virtual memory address in the instruction;
a specific way of a specific cache level to store page data associated with the virtual memory address;
data which is to be pre-fetched when accessing the page data associated with the virtual memory address in the instruction;
at least one of combining of data or not combining of data when writing page data associated with the virtual memory address;
that page data retrieved from a main memory location associated with a physical memory address corresponding to the virtual memory address in the instruction is cache inhibited;
that page data associated with the virtual memory address is guarded;
that accesses to the page data associated with the virtual memory address are write through; and
that page data associated with the virtual memory address is coherent.

15. The computer readable storage medium of claim 14, wherein the level of cache memory to store page data associated with the virtual memory address in the instruction may be different for read and write operations.

16. A system, comprising:
a processing element;
a page table comprising at least one memory address and a page attribute index value associated with the at least one memory address; and
an attribute index table comprising at least the page attribute index value and at least one page attribute associated with the page attribute index value, wherein the attribute index table comprises of a plurality of page attributes;

wherein the first processing element is configured to receive an instruction containing the at least one memory address, and compare the at least one memory address to the page table to determine the page attribute index value associated with the at least one memory address, and using the at least one page attribute index value for accessing the attribute index table and determining the page attribute, and wherein at least one of the plurality of page attributes specifies:
- a first level of cache memory for use when reading data from the page data after a cache miss; and
- a second level of cache memory for use when writing data to the page data that is different than the first level of cache memory.

17. The system of claim 16, wherein the first processing element is further configured to perform operations with the data located at a memory address associated with the instruction in a manner dictated by the at least one page attribute.

18. The system of claim 16, wherein the page table comprises a plurality of entries, and wherein each entry comprises at least a virtual memory address, a corresponding physical memory address, and an corresponding page attribute index value.

19. The system of claim 16, wherein the attribute index table comprises a plurality of entries, wherein each entry comprises at least an attribute index value and a corresponding page attribute.

* * * * *